May 5, 1953

O. G. STRAUSS 2,637,287

PLANTING MACHINE

Filed June 24, 1947

INVENTOR.
O. G. STRAUSS
BY
A. J. Kramer
ATTORNEY

May 5, 1953      O. G. STRAUSS      2,637,287

PLANTING MACHINE

Filed June 24, 1947      5 Sheets-Sheet 2

INVENTOR.
O. G. STRAUSS
BY
*G. J. Kramer*
ATTORNEY

May 5, 1953 O. G. STRAUSS 2,637,287
PLANTING MACHINE

Filed June 24, 1947 5 Sheets-Sheet 3

INVENTOR.
O. G. STRAUSS
BY *A. J. Kramer*
ATTORNEY

May 5, 1953　　　O. G. STRAUSS　　　2,637,287
PLANTING MACHINE
Filed June 24, 1947　　　　　　　　5 Sheets-Sheet 4
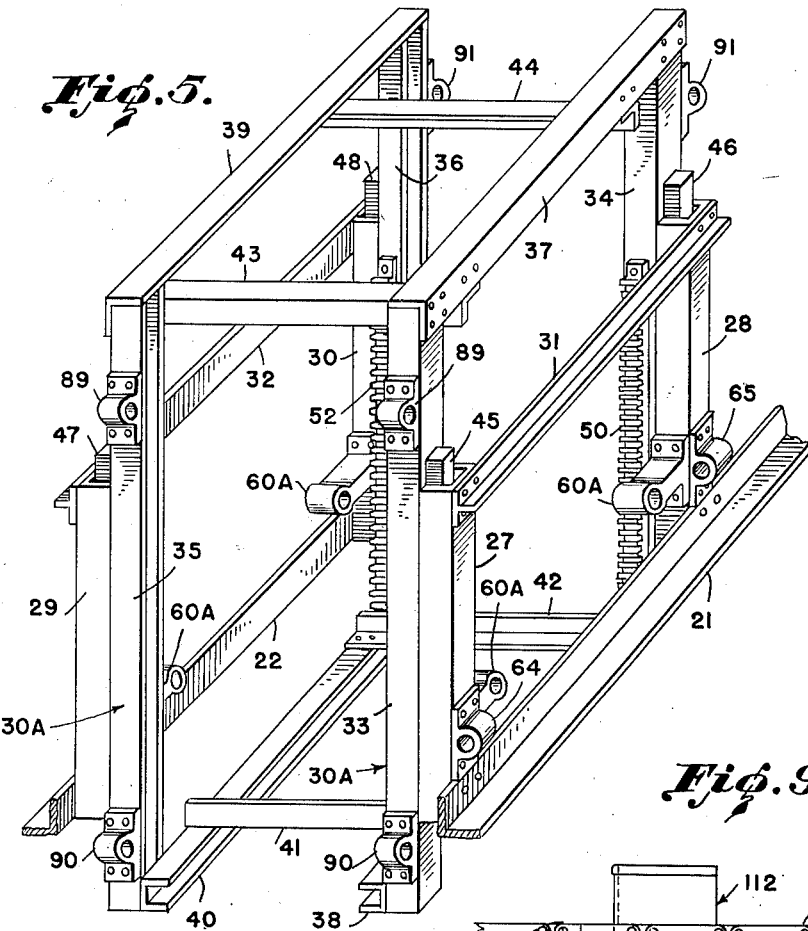
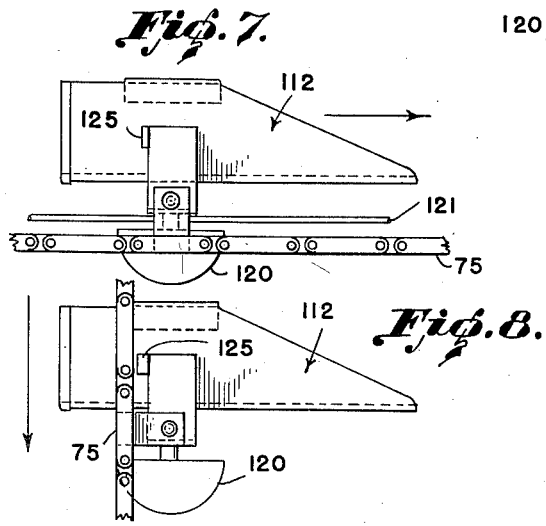
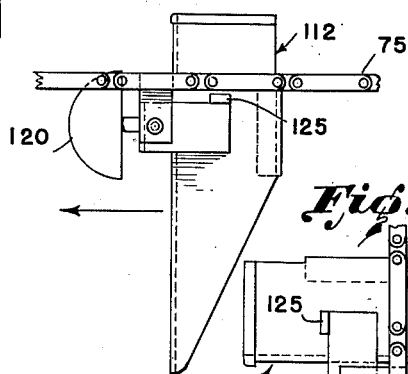
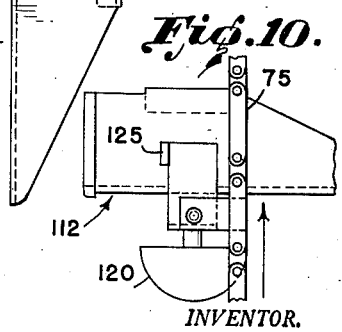
INVENTOR.
O. G. STRAUSS
BY A. J. Kramer
ATTORNEY May 5, 1953  O. G. STRAUSS  2,637,287
PLANTING MACHINE Filed June 24, 1947  5 Sheets-Sheet 5

INVENTOR.
O. G. STRAUSS
BY
G. J. Kramer
ATTORNEY

Patented May 5, 1953

2,637,287

UNITED STATES PATENT OFFICE 2,637,287

PLANTING MACHINE

Ober G. Strauss, Washington, D. C.

Application June 24, 1947, Serial No. 756,609

6 Claims. (Cl. 111—3)

(Granted under Title 35, U. S. Code (1952), sec. 266)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a planting machine that may be used for either planting seeds or transplanting seedlings of any of the various plants, such as tomato, tobacco, cabbage, sweet-potato and so forth.

In general according to the invention, the machine is provided with an endless, flexible element, said element preferably being one member of a pair of endless sprocket chains in the form of loops. The loops are disposed in laterally spaced, longitudinal, vertical planes. Preferably the loops run over sprockets so arranged as to make the loops substantially rectangular, thus forming upper, lower, forward and rearward straight portions, each portion being a side of the rectangle.

Means is provided to translate the element or chains in unison in such manner that as the machine is conveyed over the ground the velocity of the element or chains at the lower portion is zero relative to the ground. A tray (any number may be provided) for holding the material to be planted is pivotally mounted to the element or between the chains so as to travel therewith. When traveling at the upper portion, the tray is in a substantially horizontal plant material holding position and preferably is weighted to maintain this position while traveling forwardly along the upper portion and downwardly along the forward portion. In its substantially horizontal plant material holding position the tray is open at the top and forward end so as to be readily loaded with the material to be planted. Means is provided for moving the tray on its pivotal mounting so that the open end is turned downwardly to engage in the soil and be held in such position as it travels with the element or chains along the lower portion, thus to deposit the material into the soil. Preferably this means is a laterally extending member secured to the tray and which abuts a chain as the tray travels along the lower portion to hold the tray in the desired position.

Figure 5 is a three dimensional view showing the construction of the adjustable frame.

Figures 6, 7, 8, 9, and 10 are side elevational views of one of the plant carrying trays in various positions as it moves about the adjustable frame.

Figure 11:
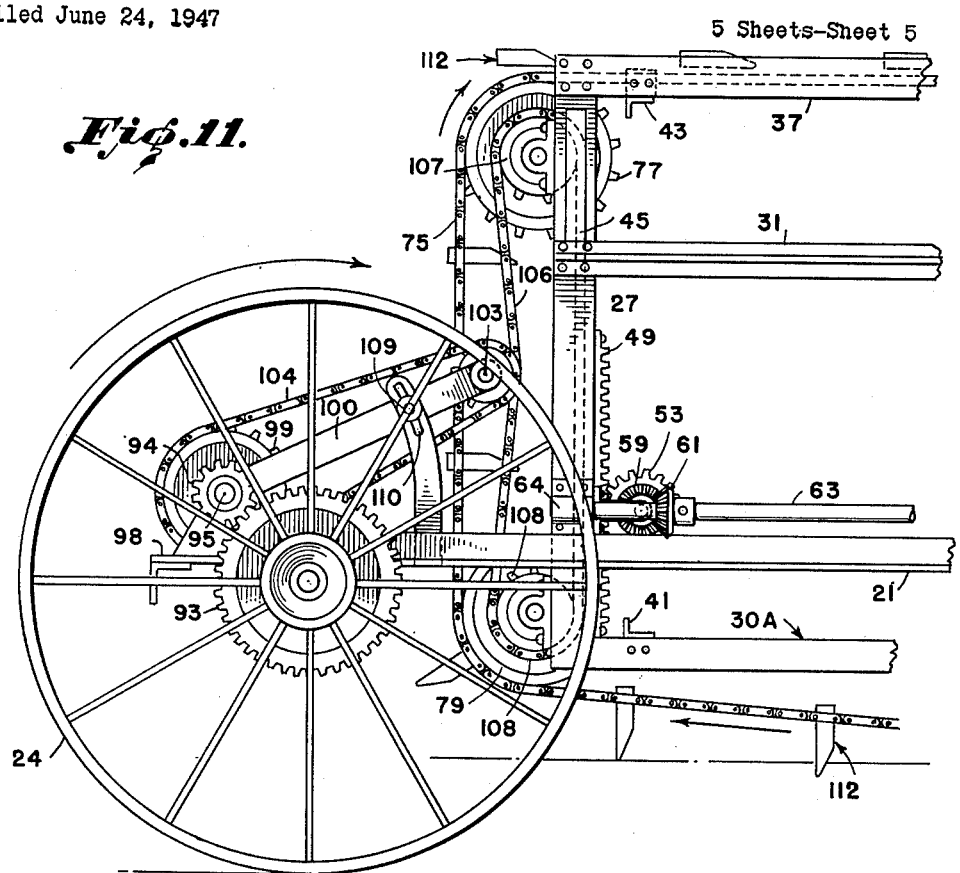

Figure 11 is a side elevational view of the rear section of the machine with the adjustable frame in an elevated position.

Figure 12:
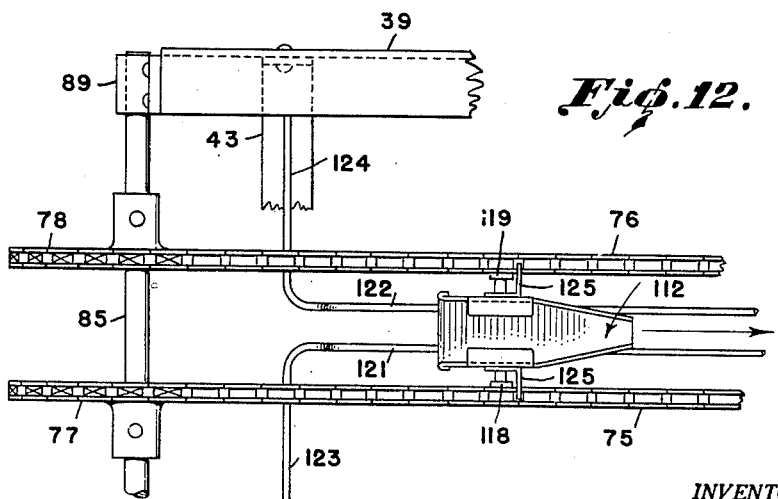

Figure 12 is a fragmentary plan view of one of the plant carrying trays as it appears when traveling along the top of the machine.

Figures 1, 13:
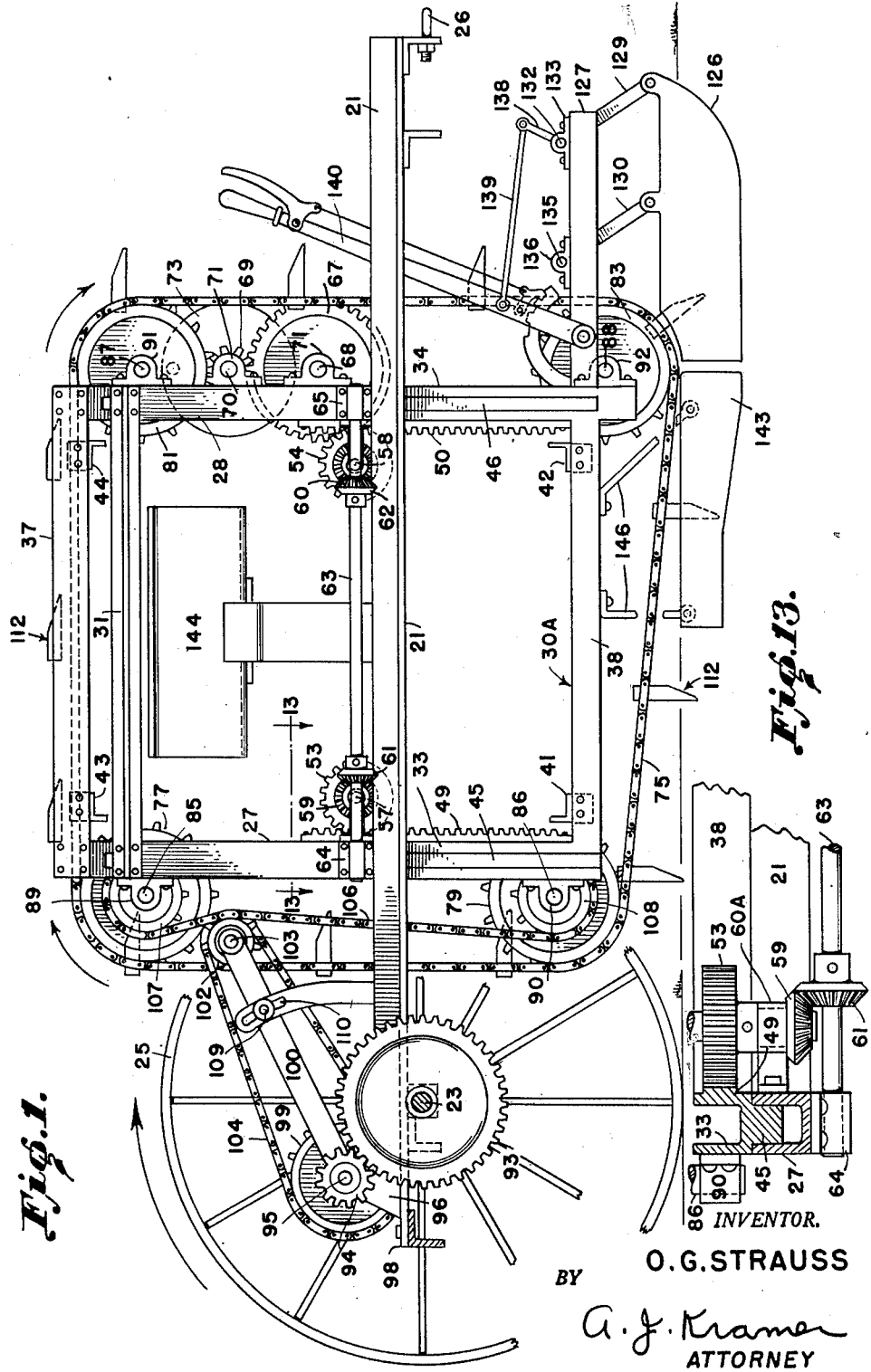
Figure 1 is a side elevational view of the embodiment, partly in section, showing the machine in operating position on level ground.
Figure 2:
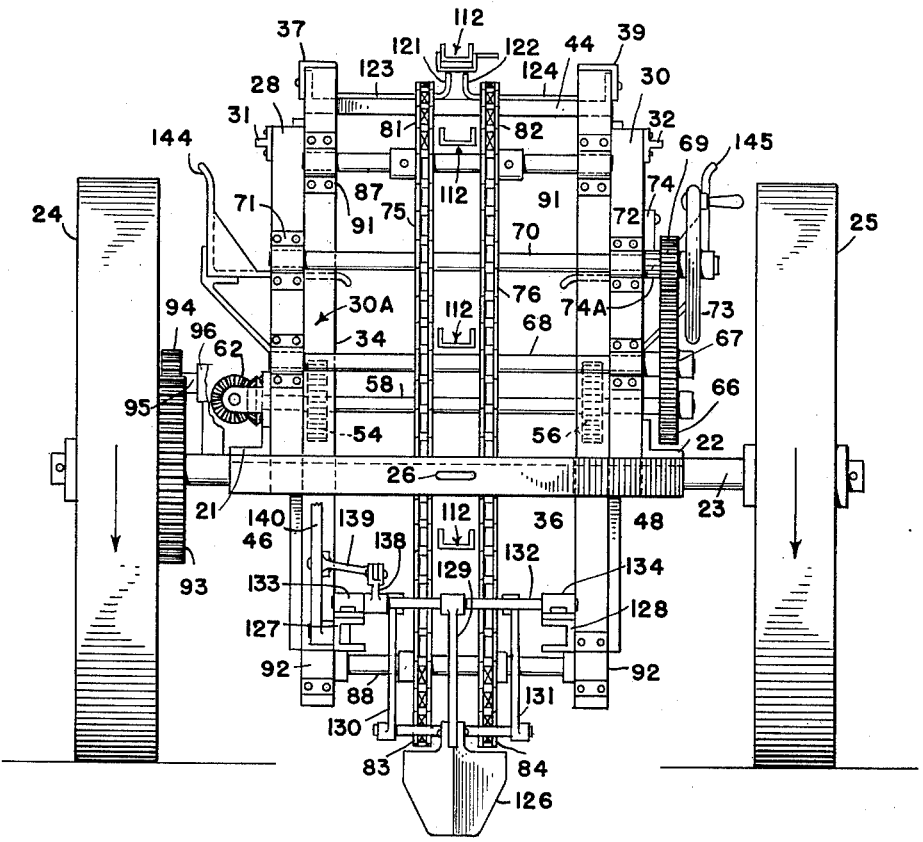
Figure 2 is a front elevational view.

Figure 13 is a section along the line 13—13 of Figure 1.

Referring with more particularity to the drawing, the machine is mounted on a main frame having horizontal bars 21 and 22.

The rear of these bars are supported on an axle 23 upon which the rear wheels 24 and 25 are mounted. The front end of bars 21 and 22 are provided with a cross beam and a hitch 26 for attachment to a tractor, jeep, draft animal, or other towing means.

To the bars 21 and 22, there are secured upright channels 27, 28 and 29, 30 respectively. These channels face inwardly and serve as guideways for the vertically adjustable box frame 30-A. The said channels are braced at the top by means of bars 31 and 32.

The box frame 30-A consists of four vertical posts 33, 34, 35, and 36, each of which is slidably engaged with one of the channels 27, 28, 29, and 30, respectively. Posts 33 and 34 are secured together at the top and bottom with tie bars 37 and 38, thus providing one side of the adjustable frame. Similar bars 39 and 40 are provided for the posts 35 and 36 to form the other side of the adjustable frame.

The two sides of the box frame are braced together by means of bottom cross ties 41 and 42, secured to the members 38 and 40, and top cross ties 43 and 44 secured to the members 37 and 39, substantially as shown. This structure provides a rigid frame, vertically moveable on posts 27, 28, 29, and 30. The frame is prevented from moving longitudinally by means of projections 45, 46, 47, and 48, secured to the members 33, 34, 35, and 36, engaging the channels 27, 28, 29, and 30, respectively.

The vertical position of the box frame 30-A is adjustable by a system of gears and racks as follows:

Vertical racks 49, 50, 51, and 52 are secured to the uprights 33, 34, 35, and 36, respectively. Each of these racks engages one of the pinions 53, 54, 55, 56. Each pair of opposite pinions 53, 55 and 54, 56, are secured to a cross shaft 57 and 58, respectively. These shafts each carry a bevel gear 59 and 60 on one side of the machine, and are rotatably supported in pillow blocks 60A on the uprights. These bevel gears mesh with oppositely facing bevel gears 61 and 62 respectively, the latter being secured to a longitudinal shaft 63, rotatably mounted in pillow blocks 64 and 65 on the posts 27 and 28. By these means the pinions may all be rotated simultaneously. When rotated in one direction the frame is elevated, while rotation in the other direction lowers the frame. These pinions are lowered through a train of gears, the first of which is spur gear 66, secured to an extension of shaft 58. This gear meshes with an idler 67 mounted on a cross shaft 68, which in turn meshes with the driving gear 69. The latter gear is secured to shaft 70 which is mounted in pillow blocks 71 and 72. Gear 69 is rotated by means of a hand wheel 73 secured to the shaft 70 on one side of the machine. The hand wheel may be held in any desired position by means of dog 74 operating against the teeth of a cog 74A on shaft 70.

The box frame 30–A carries a pair of endless, parallel sprocket chains 75 and 76 as loops in laterally spaced, longitudinal, vertical planes, thus forming an upper portion, a lower portion, a forward portion and a rearward portion of the loops. Means is provided for translating said chains in unison over 4 pairs of sprockets, namely, sprockets 77 and 78 at the upper rear of the frame, 79 and 80 at the lower rear, 81 and 82 at the upper front, and 83 and 84 at the lower front. Sprockets 79 and 80 are higher than sprockets 83 and 84 so as to put an upward angle toward the rear on the lower portion of the loop, the purpose of which will be hereinafter explained. Each of these pairs of sprocket wheels are secured to one of the shafts 85, 86, 87, and 88, respectively. These shafts are rotatably mounted on the pillow blocks 89, 89, 90, 90, 91, 91, and 92, 92 on the frame 30–A.

The sprocket wheels are powered from one of the rear wheels, such as wheel 24. The power is delivered from a gear 93 which is mounted for rotation with the wheel 24. The gear 93 meshes with another gear 94 that is secured to a cross shaft 95. Said shaft is mounted in bearings 96 and 97 on a cross beam 98 at the rear of the machine. A sprocket wheel 99 is also secured to the shaft 95 to rotate with the gear 94.

There is pivoted to shaft 95 one end of a pair of arms 100 and 101 which straddle the sprocket wheel 99. The outer ends of said arms are disposed forwardly and between them is mounted a sprocket wheel 102 on the shaft 103. The shaft 103 rotates in bearings at the forward ends of said arms substantially as shown. The sprocket wheels 99 and 102 are connected together by means of a sprocket chain 104. The shaft 103 carries another sprocket wheel 105 which can be forced in and out of engagement with a sprocket chain 106 by simultaneously moving the arms 100 and 101. The sprocket chain 106 drives two sprocket wheels 107 and 108, secured to the shafts 85 and 86 respectively. By these means power is delivered from the rear wheel 24 to drive the sprocket chains 75 and 76. The sprocket wheel 105 may be adjusted against sprocket chain 106 to tension it. This sprocket wheel is held in adjusted position by means of bolts 109 on arms 100 and 101, operating in slots 110 and 110A. By these means also a disengagement may be effected between the driving gear and the sprocket chain 106. Another means for effecting such a disengagement is the clutch 111 on the shaft 95. Either one or the other may be used, depending upon which is the more convenient under the particular circumstances, although the first means is primarily intended to adjust tension in the sprocket chain 106.

At equal intervals tray assemblies 112 are pivotally mounted between chains 75 and 76 to travel with them. These trays may be of any suitable design. The type illustrated (see Fig. 3) is useful for transplanting plants or seedlings and comprises an elongated channel 113 open at both ends and at the top when in a substantially horizontal plant material holding position. The length of the tray is sufficient to support the plants or seedlings.

Figure 3:
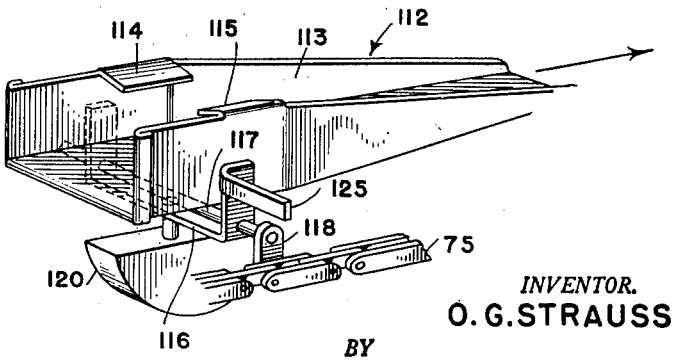
Figure 3 is a three dimensional view of one of the plant carrying trays, showing the manner in which it is attached.
Figure 4:
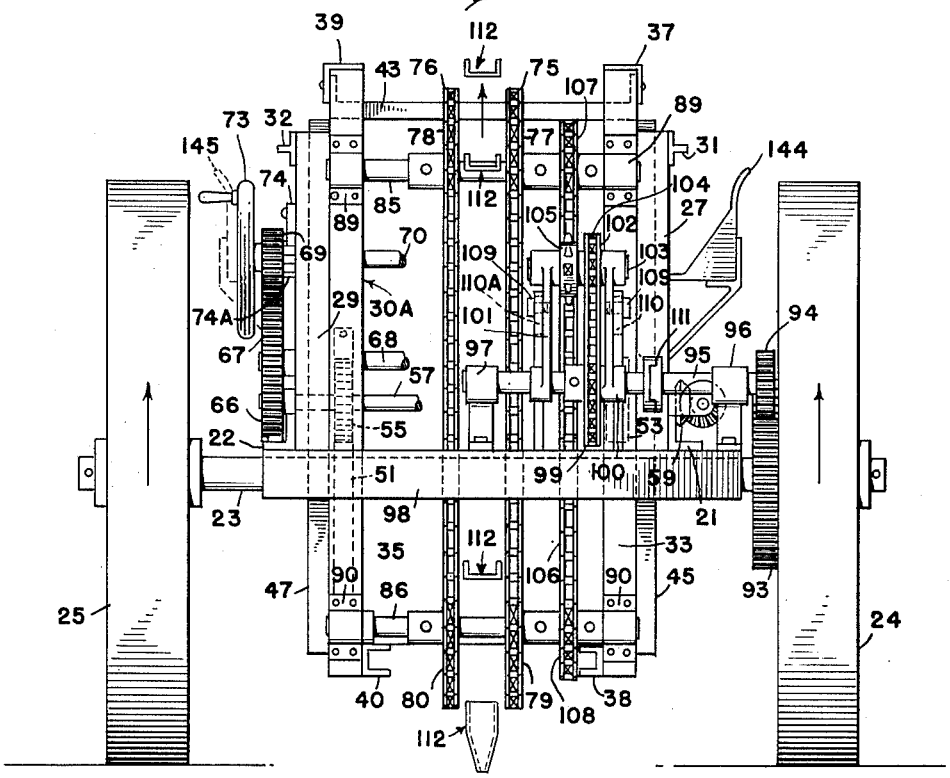
Figure 4 is a rear elevational view.
Figure 6:
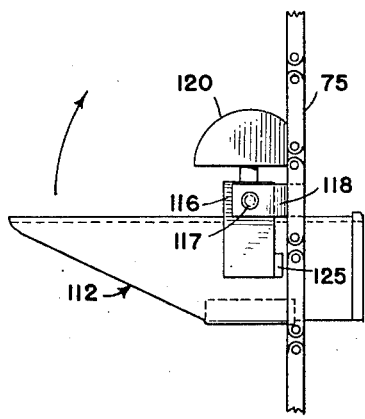

The sides at the front section of the tray taper downwardly toward the direction of movement substantially as shown. The sides of the rear section are provided at the top with inwardly extending tabs 114 and 115. The tabs are preferably slightly depressed at the center, as illustrated in Figure 3, to facilitate placing the plants in the tray in proper position, and at the same time to prevent the plants from being displaced once they are set in the trays. Each tray is secured to the top of a wide flat U bracket 116. A cross shaft 117 is secured to the bracket. The ends of the shaft 117 extend outwardly to the sprocket chains 75 and 76 to which they are pivoted by means of bearing brackets 118 and 119. These bearing brackets may be either welded to links of the sprocket chains or formed as integral parts thereof.

The tray is weighted with a weight 120 attached to the bottom center of the bracket 116, such that the center of gravity of the tray and weight is below the pivotal mounting of the tray, the function of which will be hereinafter more fully explained. In order to keep the trays on an even keel when material is placed in the trays while traveling along the upper portion of the loop, a pair of guide tracks 121 and 122 of rods, heavy wire or other suitable material is disposed slightly above the space between the sprocket chains 75 and 76. The tracks are supported by lateral extensions 123 and 124 that pass under the sprocket chains and are fastened to the top of the members 37 and 39. These guide tracks engage the bottom of the brackets 116 as shown in Figure 7. At least one side of bracket 116 is provided with a laterally extending member 125, which functions as an abutment against its corresponding sprocket chain during part of its travel cycle on the sprocket chains, hereinafter more fully explained.

A runner 126 for making a furrow in the soil is attached to forward extensions 127 and 128 of channels 38 and 40 respectively. The attachment to these extensions is made by means of a link 129 at the forward end of the runner and links 130 and 131 toward the rear. The link 129 is connected to a cross shaft 132 which is rotatably mounted in pillow blocks 133 and 134 on the extensions 127 and 128. The links 130 and 131 are both connected to a cross shaft 135 behind the shaft 132. Shaft 135 is rotatably mounted in bearings 136 and 137 on the extensions 127 and 128. An arm 138 has one end secured to the shaft 132, and the other end projecting upwardly where it is pinned to the end of a link 139. The other end of the link 139 is pinned to a handlocking lever 140. Movement of this lever permits a constrained adjustment of the runner 126 in accordance with the linkage described.

Immediately to the rear of the runner 126, there is secured to the bottom of the movable frame any suitable device for closing the furrow made by the runner 126. The device illustrated in the drawing comprises conventional press plates 143 attached to suspenders 146, but any other suitable means may be used, such as press wheels, etc.

In operation the forward end of the machine is connected to a tractor or other suitable towing device (not shown) by means of the hitch 26. The connection is made in such a way that the front end of the machine is also supported by the towing device, although front wheels (not shown) may be added to the device if desired. The vertical position of the vertically adjustable frame is then adjusted by means of the hand wheel 73 to the point where the plates 143 and runner 126 are in proper position relative to the ground with respect to the depth of transplating desired. A closer adjustment for the runner 126 is accomplished by actuating the lever 140. At least one operator is necessary who sits on one of the seats 144, 145 to feed the plants into the trays. However, if more rapid operation is desired, two operators may be employed, one on each of the seats. Additional operators may be provided at any suitable point on the machine if additional speed is necessary. For example, additional seats (not shown) may be added on the front of the bars 21 and 22, or at the rear thereof.

The machine is then conveyed over the ground where the transplanting is to be accomplished, and the operators place the seedlings in the trays 112, one seedling in each tray. As the machine moves, power is delivered from the rear wheel 24, through gears 93, 94, sprocket 99, sprocket chain 104, sprocket wheels 102 and 105, and sprocket chain 106 to effect rotation of the shafts 85 and 86, which in turn rotate the sprocket wheels 77, 78, 79, and 80, causing the sprocket chains 75 and 76 to move around on their supporting sprocket wheels and carry with them the plant trays 112. The power train from the rear wheel 24 to the sprocket chains 75 and 76 is so designed that the velocity of the sprocket chains 75 and 76 at the lower portion of the loops is zero relative to the ground. This requires the linear speed of the chains relative to the frame to be equal to the ground speed of the vehicle. The choice of gearing ratios to accomplish this purpose may be made by any one skilled in the art.

As the plant trays travel around the chains 75, 76, they pass through four distinct position cycles. At the upper portion of the loops (see Figure 7) the plant trays are in their substantially horizontal plant material holding or loading position and each is held that way by means of its weight 120. Also, as they travel forwardly with the chains in this position, the trays are maintained in a steady position by means of the guide tracks 121 and 122. While traveling forwardly, the laterally extending member 125 projects above one of the chains out of contact therewith.

The plants are placed on the trays in this position by the operator with the root end at the front and the leaf end toward the rear. The slight declination of the tabs 114 and 115 assists the plants in dropping down into the tray and also holds them in that position until they are ready to be released.

As the plant trays proceed toward the front, they leave the tracks 121 and 122, are carried over the sprockets 81 and 82 and hence travel downwardly with the chains along their forward portion. However, the trays are still maintained in a substantially horizontal plant material holding position due to the action of gravity on the weight 120. See Figure 8. In this position also, it will be noted that the laterally extending member 125 is disposed forwardly of the sprocket chain.

As each plant tray proceeds farther, it travels around the sprockets 83 and 84, and in doing so is pivoted so that its open forward end is turned downwardly to engage into the soil, as it travels with the chains along their lower portion, due to the fact that the force of the weight 120 holds the extending member 125 in abutment with its corresponding sprocket chain, the laterally extending member coming into abutment with the chain on the lower side thereof as the tray travels from the forward portion to the lower portion of the loop, thus to pivot the tray and hold it with its open end downward during such travel.

At this point the tray is between the sides of the runner 126 at the rear section thereof where the furrow has been made.

With the tray in this position the plant is disposed upright with its root end directly against the bottom of the furrow. Since the velocity of the sprocket chains 75 and 76 along the bottom is zero relative to the ground, the plant tray serves to maintain the seedlings in an upright position until the furrow closer 146 operates about it and packs the soil tightly around the plant.

At the same time that this action is taking place, the plant tray is also being gradually elevated. See Figure 1. The combination of this action plus the fact that the lower end of the tray in this position is tapered, permits a close packing of soil about the plants. As the tray is withdrawn, the soil packed about the plant holds it in place. Eventully the plant tray in this position is fully withdrawn from the soil as its elevation is continued until it reaches the sprocket wheels 79 and 80. As the plant tray moves about the sprocket wheels it is maintained in the same relative position with respect to the sprocket chains by virtue of the abutment of member 125 against the sprocket chain. When the chain eventually assumes a vertical position, the weight 120 will at first be on top of the tray (see Figure 6) and the momentum imparted to the weight in moving from a horizontal to a vertical position will cause it to be thrown inwardly of the vertical center line of the pivot shaft 117, whereupon the extending member disengages itself from the chain. The effect of the weight will then be to turn the tray by gravity about its pivot 180°, thereby causing the tray to assume its substantially horizontal plant material holding position.

As the tray is carried upward by the sprocket chains and passes over the sprocket wheels 77 and 78, the weight 120 maintains it in its substantially horizontal plant material holding position until it again contacts the guide rods 121 and 122, at which time the cycle of operation is repeated.

Sprocket chain links being removable, any number of plant carrying trays may be included for any desired interval of planting.

It may be seen from Figures 1 and 11 that the machine may be used for planting and transplanting on level ground or in ridge rows, merely by adjusting the elevation of the frame 30-A. Figure 1 shows the frame in position for planting on level ground, and Figure 11 shows the position for planting in ridge rows.

Having thus described my invention, I claim:

1. A planting machine comprising a pair of endless sprocket chains in the form of loops disposed in laterally-spaced longitudinal vertical planes, each loop consisting of a substantially horizontal upper portion, a substantially vertical forward portion, a lower portion and a substantially vertical rear portion, means for translating said chains in unison such that as the planting machine is conveyed over the ground the upper portions travel forwardly, the forward portions travel downwardly, the lower portions travel rearwardly, the rear portions travel upwardly and the velocity of the lower portions is zero relative to the ground, a tray for holding material to be planted pivotally mounted between the chains to travel with them, a weight attached to the tray such that the center of gravity of the weight and tray is below the pivotal mounting of the tray to maintain said tray in a substantially horizontal plant material holding position while traveling forwardly along the upper portions and downwardly along the forward portions, said tray when in said holding position being open at the top and forward end, a laterally extending member secured to said tray and disposed above one of said chains out of contact therewith while the tray is traveling forwardly and disposed forwardly of said chain while the tray is traveling downwardly, said member coming into contact with said chain under influence of gravity as the tray turns from traveling downwardly along the forward portions to traveling rearwardly along the lower portions to move the tray on its pivotal mounting and hold it with its open end downwardly during travel along the lower portions, said member coming out of contact with said chain under the influence of the momentum imparted said tray and weight as the tray turns from traveling along the lower portions to traveling along the rear portions for releasing the tray from the position with its open end downwardly and permitting the tray to move on its pivotal mounting under the influence of gravity to said holding position.

2. A planting machine comprising a flexible element in the form of a loop disposed in a longitudinal vertical plane and consisting of a substantially horizontal upper portion, a substantially vertical forward portion, a lower portion and a substantially vertical rear portion, means for translating said element such that as the planting machine is conveyed over the ground the upper portion travels forwardly, the forward portion travels downwardly, the lower portion travels rearwardly, the rear portion travels upwardly and the velocity of the lower portion is zero relative to the ground, a tray for holding material to be planted pivotally mounted on said element to travel therewith, a weight attached to the tray such that the center of gravity of the weight and tray is below the pivotal mounting of the tray to maintain said tray in a substantially horizontal plant material holding position while traveling forwardly along the upper portion and downwardly along the forward portion, said tray when in said holding position being open at the top and forward end, a laterally extending member secured to said tray and disposed above said element out of contact therewith while the tray is traveling forwardly and disposed forwardly of said element while the tray is traveling downwardly, said member coming into contact with said element under influence of gravity as the tray turns from traveling downwardly along the forward portion to traveling rearwardly along the lower portion to move the tray on its pivotal mounting and hold it with its open end downwardly during travel along the lower portion, said member coming out of contact with said element under the influence of the momentum imparted said tray and weight as the tray turns from traveling along the lower portion to traveling along the rear portion for releasing the tray from the position with its open end downwardly and permitting the tray to move on its pivotal mounting under the influence of gravity to said holding position.

3. A planting machine comprising a pair of endless sprocket chains in the form of loops disposed in laterally-spaced longitudinal vertical planes, each loop consisting of a substantially horizontal upper portion, a substantially vertical forward portion, a lower portion and a substantially vertical rear portion, means for translating said chains in unison such that as the planting machine is conveyed over the ground the upper portions travel forwardly, the forward portions travel downwardly, the lower portions travel rearwardly, the rear portions travel upwardly and the velocity of the lower portions is zero relative to the ground, a tray for holding material to be planted pivotally mounted between the chains to travel with them, a weight attached to the tray such that the center of gravity of the weight and tray is below the pivotal mounting of the tray to maintain said tray in a substantially horizontal plant material holding position while traveling forwardly along the upper portions and downwardly along the forward portions, said tray when in said holding position being open at the top and forward end, and means associated with said tray brought into cooperative relationship with one of said chains as the tray turns from traveling downwardly along the forward portions to traveling rearwardly along the lower portions to move the tray on its pivotal mounting and hold it with its open end downwardly during travel along the lower portions, said means coming out of said cooperative relationship with said chain under the influence of the momentum imparted said tray and weight as the tray turns from traveling along the lower portions to traveling along the rear portions for releasing the tray from the position with its open end downwardly and permitting the tray to move on its pivotal mounting under the influence of gravity to said holding position.

4. A planting machine comprising a flexible element in the form of a loop disposed in a longitudinal vertical plane and consisting of a substantially horizontal upper portion, a substantially vertical forward portion, a lower portion and a substantially vertical rear portion, means for translating said element such that as the planting machine is conveyed over the ground the upper portion travels forwardly, the forward portion travels downwardly, the lower portion travels rearwardly, the rear portion travels upwardly and the velocity of the lower portion is zero relative to the ground, a tray for holding material to be planted pivotally mounted on said element to travel therewith, a weight attached to the tray such that the center of gravity of the weight and tray is below the pivotal mounting of the tray to maintain said tray in a substantially horizontal plant material holding position while traveling forwardly along the upper portion and downwardly along the forward portion, said tray when in said holding position being open at the top and forward end, and means associated with said tray brought into cooperative relationship with said element as the tray turns from traveling downwardly along the forward portion to traveling rearwardly along the lower portion to move the tray on its pivotal mounting and hold it with its open end downwardly during travel along the lower portion, said means coming out of said cooperative relationship with said element under the influence of the momentum imparted said tray and weight as the tray turns from traveling along the lower portion to traveling along the rear portion for releasing the tray from the position with its open end downwardly and permitting the tray to move on its pivotal mounting under the influence of gravity to said holding position.

5. A planting machine comprising a flexible element in the form of a loop disposed in a longitudinal vertical plane and comprising an upper portion, a forward portion, a lower portion and a rear portion, means for translating said element such that as the planting machine is conveyed over the ground the upper portion travels forwardly, the forward portion travels downwardly, the lower portion travels rearwardly, the rear portion travels upwardly and the velocity of the lower portion is zero relative to the ground, a tray for holding material to be planted pivotally mounted on said element to travel therewith, said tray being so weighted that its center of gravity is below its pivotal mounting to maintain said tray in a substantially horizontal plant material holding position while traveling forwardly along the upper portion and downwardly along the forward portion, said tray when in said holding position being open at the top and forward end, and means associated with said tray brought into cooperative relationship with said element as the tray turns from traveling downwardly along the forward portion to traveling rearwardly along the lower portion to move the tray on its pivotal mounting and hold it with its open end downwardly during travel along the lower portion, said means coming out of said cooperative relationship with said element after travel of the tray along the lower portion for releasing the tray from the position with its open end downwardly and permitting the tray to move on its pivotal mounting under the influence of gravity to said holding position.

6. A planting machine comprising a pair of endless sprocket chains in the form of loops disposed in laterally-spaced longitudinal vertical planes each loop comprising an upper portion, a forward portion, a lower portion and a rear portion, means for translating said chains in unison such that as the planting machine is conveyed over the ground the upper portions travel forwardly, the forward portions travel downwardly, the lower portions travel rearwardly, the rear portions travel upwardly and the velocity of the lower portions is zero relative to the ground, a tray for holding material to be planted pivotally mounted between the chains to travel with them, said tray being so weighted that its center of gravity is below its pivotal mounting to maintain said tray in a substantially horizontal plant material holding position while traveling forwardly along the upper portions and downwardly along the forward portions, said tray when in said holding position being open at the top and forward end, and means associated with said tray brought into cooperative relationship with one of said chains as the tray turns from traveling downwardly along the forward portion to traveling rearwardly along the lower portion to move the tray on its pivotal mounting and hold it with its open end downwardly during travel along the lower portion, said means coming out of said cooperative relationship with said chain under the influence of the momentum imparted said tray as the tray turns from traveling along the lower portion to traveling along the rear portion for releasing the tray from the position with its open end downwardly and permitting the tray to move on its pivotal mounting under the influence of gravity to said holding position.

OBER G. STRAUSS.

References Cited in the file of this patent

UNITED STATES PATENTS

| Number | Name | Date |
| --- | --- | --- |
| 1,506,843 | Komarnisky | Sept. 2, 1924 |
| 1,765,467 | Vollink | June 24, 1930 |
| 1,768,534 | Aiken | July 1, 1930 |
| 1,802,273 | Richards et al. | Apr. 21, 1931 |
| 1,996,686 | Poll | Apr. 2, 1935 |

FOREIGN PATENTS

| Number | Country | Date |
| --- | --- | --- |
| 21,129 | Great Britain | 1895 |
| 321,433 | Germany | June 3, 1920 |
| 325,571 | Great Britain | Feb. 21, 1930 |
| 434,035 | Germany | Sept. 17, 1926 |